US012132723B2

(12) United States Patent
Amichay et al.

(10) Patent No.: US 12,132,723 B2
(45) Date of Patent: Oct. 29, 2024

(54) SECURITY PROFILE MANAGEMENT FOR MULTI-CLOUD AGENT REGISTRATION WITH MULTI-TENANT, MULTI-CELL SERVICE

(71) Applicant: BMC Software Israel Ltd, Tel Aviv (IL)

(72) Inventors: Nathan Amichay, Tel-Aviv (IL); Eissam Yasin, Tel-Aviv (IL); Yaniv Adler, Tel-Aviv (IL); Erez Gordon, Tel-Aviv (IL); Roman Zemelman, Tel-Aviv (IL); Ronit Avrahami, Tel-Aviv (IL); Osnat Nagar, Tel-Aviv (IL)

(73) Assignee: BMC Software, Inc., Houston, TX (US)

( * ) Notice: Subject to any disclaimer, the term of this patent is extended or adjusted under 35 U.S.C. 154(b) by 328 days.

(21) Appl. No.: 17/646,651

(22) Filed: Dec. 30, 2021

(65) Prior Publication Data

US 2023/0171241 A1 Jun. 1, 2023

Related U.S. Application Data

(60) Provisional application No. 63/264,701, filed on Nov. 30, 2021.

(51) Int. Cl.
*H04L 9/40* (2022.01)
(52) U.S. Cl.
CPC ...... *H04L 63/0823* (2013.01); *H04L 63/0876* (2013.01); *H04L 63/102* (2013.01); *H04L 63/20* (2013.01)

(58) Field of Classification Search
CPC .............. H04L 63/0823; H04L 63/102; H04L 63/0876; H04L 63/08; H04L 63/083; H04L 63/0428; H04L 9/3247; H04L 63/10; H04W 12/06
See application file for complete search history.

(56) References Cited

U.S. PATENT DOCUMENTS

| | | | | |
|---|---|---|---|---|
| 8,756,674 | B2 * | 6/2014 | Ronda | H04L 9/3228 713/168 |
| 8,850,187 | B2 * | 9/2014 | Hoggan | H04L 63/107 726/8 |
| 8,925,055 | B2 * | 12/2014 | Nair | G06F 21/60 713/157 |
| 9,083,533 | B2 * | 7/2015 | Ronda | H04L 9/3213 |
| 9,191,298 | B1 * | 11/2015 | Bilby | H04L 43/10 |
| 9,281,949 | B2 * | 3/2016 | Nair | H04L 9/3268 |

(Continued)

*Primary Examiner* — Ninos Donabed
(74) *Attorney, Agent, or Firm* — Brake Hughes Bellermann LLP (57) ABSTRACT

This document describes systems and techniques enabling the secure registration of an agent such that the agent has secure and trusted access to its specific tenant and specific resources in a multi-region, multi-tenant, multi-cell SaaS platform. The systems and techniques use a secure and robust agent registration process to enable the creation of a unique security profile for each specific agent to enable access only to its specific tenant and specific resources that the agent uses to communicate with the SaaS platform to carry out jobs. The systems and techniques result in a registration process that is scalable for thousands or millions of agents in an environment having segregated SaaS platform cells.

15 Claims, 9 Drawing Sheets

(56) References Cited

U.S. PATENT DOCUMENTS

| | | | |
|---|---|---|---|
| 9,397,838 B1* | 7/2016 | Chen | H04W 12/06 |
| 10,356,087 B1* | 7/2019 | Vetter | H04L 63/0838 |
| 10,404,477 B1* | 9/2019 | Deck | H04L 9/3247 |
| 10,958,662 B1* | 3/2021 | Sole | H04L 63/0853 |
| 11,030,618 B1* | 6/2021 | Budko | G06Q 20/40145 |
| 11,134,058 B1* | 9/2021 | Sole | G06F 21/552 |
| 11,218,297 B1* | 1/2022 | Hegg | H04L 9/0894 |
| 11,240,043 B1* | 2/2022 | Leblang | H04L 67/025 |
| 11,362,844 B1* | 6/2022 | Cook | H04L 9/3265 |
| 11,457,040 B1* | 9/2022 | Sole | H04L 63/101 |
| 11,595,358 B2* | 2/2023 | Sharma | H04L 63/0823 |
| 2011/0302646 A1* | 12/2011 | Ronda | H04L 9/3268 726/9 |
| 2012/0233705 A1* | 9/2012 | Boysen | G06F 21/77 726/29 |
| 2013/0047057 A1* | 2/2013 | Resch | H04L 9/321 714/799 |
| 2013/0297513 A1* | 11/2013 | Kirillin | G06Q 40/02 705/67 |
| 2013/0311771 A1* | 11/2013 | Hoggan | H04L 9/3268 713/156 |
| 2014/0007215 A1* | 1/2014 | Romano | H04L 63/0281 726/12 |
| 2014/0059213 A1* | 2/2014 | Ollikainen | G06Q 30/0282 709/224 |
| 2014/0075524 A1* | 3/2014 | Ho | G06F 21/45 726/6 |
| 2014/0115676 A1* | 4/2014 | Coghlan | H04W 12/069 726/6 |
| 2014/0282961 A1* | 9/2014 | Dorfman | G06Q 20/3276 726/7 |
| 2015/0095239 A1* | 4/2015 | Specogna | G06Q 20/405 705/72 |
| 2015/0095240 A1* | 4/2015 | Specogna | G06Q 20/385 705/72 |
| 2015/0134967 A1* | 5/2015 | Moore | H04L 63/0823 713/168 |
| 2015/0304319 A1* | 10/2015 | Ronda | H04L 9/3228 726/9 |
| 2016/0087955 A1* | 3/2016 | Mohamad Abdul | H04L 47/125 726/7 |
| 2016/0127353 A1* | 5/2016 | Thomas | H04L 9/006 713/156 |
| 2016/0189123 A1* | 6/2016 | Lucia Specogna | G06Q 20/1085 705/43 |
| 2016/0344559 A1* | 11/2016 | Ma | H04W 12/069 |
| 2017/0163629 A1* | 6/2017 | Law | H04L 63/0823 |
| 2017/0187808 A1* | 6/2017 | Redgate | H04L 63/061 |
| 2017/0366538 A1* | 12/2017 | Bowen | H04L 63/0823 |
| 2018/0048638 A1* | 2/2018 | Lewis | H04L 9/3268 |
| 2018/0139205 A1* | 5/2018 | Devaney | H04L 63/108 |
| 2019/0296918 A1* | 9/2019 | Chang | H04L 9/006 |
| 2019/0306138 A1* | 10/2019 | Carru | H04L 63/10 |
| 2019/0312857 A1* | 10/2019 | Lander | H04L 9/3271 |
| 2019/0349357 A1* | 11/2019 | Shukla | H04L 63/20 |
| 2020/0013050 A1* | 1/2020 | Finlow-Bates | H04L 9/3239 |
| 2020/0021567 A1* | 1/2020 | Salgaonkar | H04L 9/14 |
| 2020/0220719 A1* | 7/2020 | Chaudhari | H04L 9/0822 |
| 2021/0200814 A1* | 7/2021 | Tal | G06F 16/90335 |
| 2021/0390537 A1* | 12/2021 | Budko | H04L 63/0823 |
| 2021/0409409 A1* | 12/2021 | Palanisamy | H04L 63/10 |
| 2022/0329570 A1* | 10/2022 | Sharma | H04L 63/04 |
| 2023/0171241 A1* | 6/2023 | Amichay | H04L 63/0876 726/4 |

* cited by examiner

SECURITY PROFILE MANAGEMENT FOR MULTI-CLOUD AGENT REGISTRATION WITH MULTI-TENANT, MULTI-CELL SERVICE

CROSS-REFERENCE TO RELATED APPLICATION

This application claims the benefit of U.S. Provisional Patent Application No. 63/264,701, filed Nov. 30, 2021, titled "Security Profile Management For Multi-Cloud Agent Registration With Multi-Tenant, Multi-Cell Service," which is hereby incorporated by reference in its entirety.

TECHNICAL FIELD

This description relates to security profile management for multi-cloud agent registration with multi-tenant, multi-cell service.

BACKGROUND

Technology systems may use multiple different applications, technologies, and processes to run complex data and application workflows across hybrid and multi-cloud environments. The hybrid and multi-cloud environments may include a multi-region, multi-tenant, multi-cell software as a service (SaaS) platform to integrate, automate, and orchestrate the complex data and application workflows. The SaaS platform may use multiple agents. Agents communicate with the SaaS platform and submit jobs for execution on the host computer, monitor jobs, and perform post-processing analysis of completed jobs. The job completion status and the post-processing analysis results may be communicated back to the SaaS platform. Multiple agents may be installed on each computer, where the agents are managed by the SaaS platform. The agents may be installed in on-premise environments and/or cloud-based environments. In such environments, agent identification and security of communications between specific agents and specific resources on specific tenants is highly desirable.

SUMMARY

According to one general aspect, a computer-implemented method for registering an agent and providing access by the agent to a specific resource on a specific tenant on a multi-cell, multi-tenant software as a service (SaaS) platform, includes receiving a request from a computing device for a token and an agent installer. In response to authenticating the request, the token and the agent installer are communicated to the computing device, where the token includes a first endpoint. The token, a unique agent identity, and a certificate signing request (CSR) are received from the computing device at the first endpoint. In response to validating the token at the first endpoint, the CSR is signed to create a signed CSR, a first mapping of the signed CSR to the unique agent identity is created, a second mapping of a security profile for the agent is created, where the security profile includes the unique agent identity mapped to a specific resource on a specific tenant on the SaaS platform, and the signed CSR and a second endpoint is sent to the agent. A request for a temporary credential is received from the agent at the second endpoint using the signed CSR. The request for the temporary credential is validated by comparing the signed CSR to the first mapping. In response to validating the request for the temporary credential, the temporary credential is generated using the second mapping and the temporary credential is sent to the agent. An access request is received from the agent to the specific resource on the specific tenant using the temporary credential and access to the agent to the specific resource on the specific tenant is provided based on the temporary credential.

Implementations may include one or more of the following features. For example, in some implementations, the first endpoint may be an application programming interface (API) gateway. In some implementations, the temporary credential may be invalid after a single access by the agent to the specific resource on the specific tenant. In some implementations, the security profile maps the unique agent identity to multiple specific resources across multiple specific tenants.

In some implementations, the computer-implemented method further includes receiving a request to re-register the agent, where the request to re-register the agent includes a hash of the signed CSR and the unique agent identity. The request to re-register the agent is validated by authenticating the hash of the signed CSR, authenticating the unique agent identity, and confirming from the specific tenant that the unique agent identity is invalid.

In some implementations, the computer-implemented method further includes generating a new signed CSR and a new endpoint, updating the first mapping and the second mapping, and communicating the new signed CSR and the new endpoint to the agent.

In some implementations, the computer-implemented method further includes receiving a request for a new temporary credential from the agent at the new endpoint using the new signed CSR, validating the request for the new temporary credential by comparing the new signed CSR to the first mapping, in response to validating the request for the new temporary credential, generating the new temporary credential using the second mapping and sending the new temporary credential to the agent, receiving a new access request from the agent to the specific resource on the specific tenant using the new temporary credential, and providing access to the agent to the specific resource on the specific tenant based on the new temporary credential.

In some implementations, the computer-implemented method further includes updating the security profile to map the unique agent identity mapped to a new specific resource on a new specific tenant on the SaaS platform In another general aspect, a computer-implemented method for registering an agent and providing access by the agent to a specific resource on a specific tenant on a multi-cell, multi-tenant software as a service (SaaS) platform includes requesting a token and an agent installer from the SaaS platform, receiving the token and the agent installer from the SaaS platform, the token including a first endpoint, creating a private key (PK) and generating a certificate signing request (CSR) using the PK, communicating the token, a unique agent identity, and the CSR to the first endpoint, receiving a signed CSR and a second endpoint from the SaaS platform, requesting a temporary credential from the second endpoint using the signed CSR, receiving the temporary credential from the second endpoint, requesting access to a specific resource on a specific tenant using the temporary credential, and receiving access to the specific resource on the specific tenant.

Implementations may include one or more of the following features. For example, the first endpoint may be an application programming interface (API) gateway.

In some implementations, the temporary credential may be invalid after a single access to the specific resource on the specific tenant.

In some implementations, the computer-implemented method further includes receiving an error code, in response to receiving the error code, sending a request to re-register, the request to re-register including a hash of the signed CSR and the unique agent identity, and receiving a new signed CSR and a new endpoint.

In some implementations, the computer-implemented method further includes requesting a new temporary credential from the new endpoint using the new signed CSR, receiving the new temporary credential from the new endpoint, requesting access to the specific resource on the specific tenant using the new temporary credential, and receiving access to the specific resource on the specific tenant.

The above general aspects and example implementations may be implemented on a system and/or as part of a computer program product.

DETAILED DESCRIPTION

This document describes systems and techniques enabling the secure registration of an agent such that the agent has secure and trusted access to its specific tenant and specific resources in a multi-region, multi-tenant, multi-cell SaaS platform. The systems and techniques use a secure and robust agent registration process to enable the creation of a unique security profile for each specific agent to enable access only to its specific tenant and specific resources that the agent uses to communicate with the SaaS platform to carry out jobs. The systems and techniques result in a registration process that is scalable for thousands or millions of agents in an environment having segregated SaaS platform cells. In the example figures and the description below, agents also may be interchangeably referred to as "things."

As referred to in this document, an agent (or thing) may be a software entity installed on a hardware device that is configured to communicate with the SaaS platform. The agent is configured to perform one or more jobs using resources accessed on the SaaS platform. The agent may be installed in any type of operating environment including, for example, in an on-premise datacenter computing machine, private and/or public cloud environments, and virtual and/or physical hosts or containers.

Figure 1:
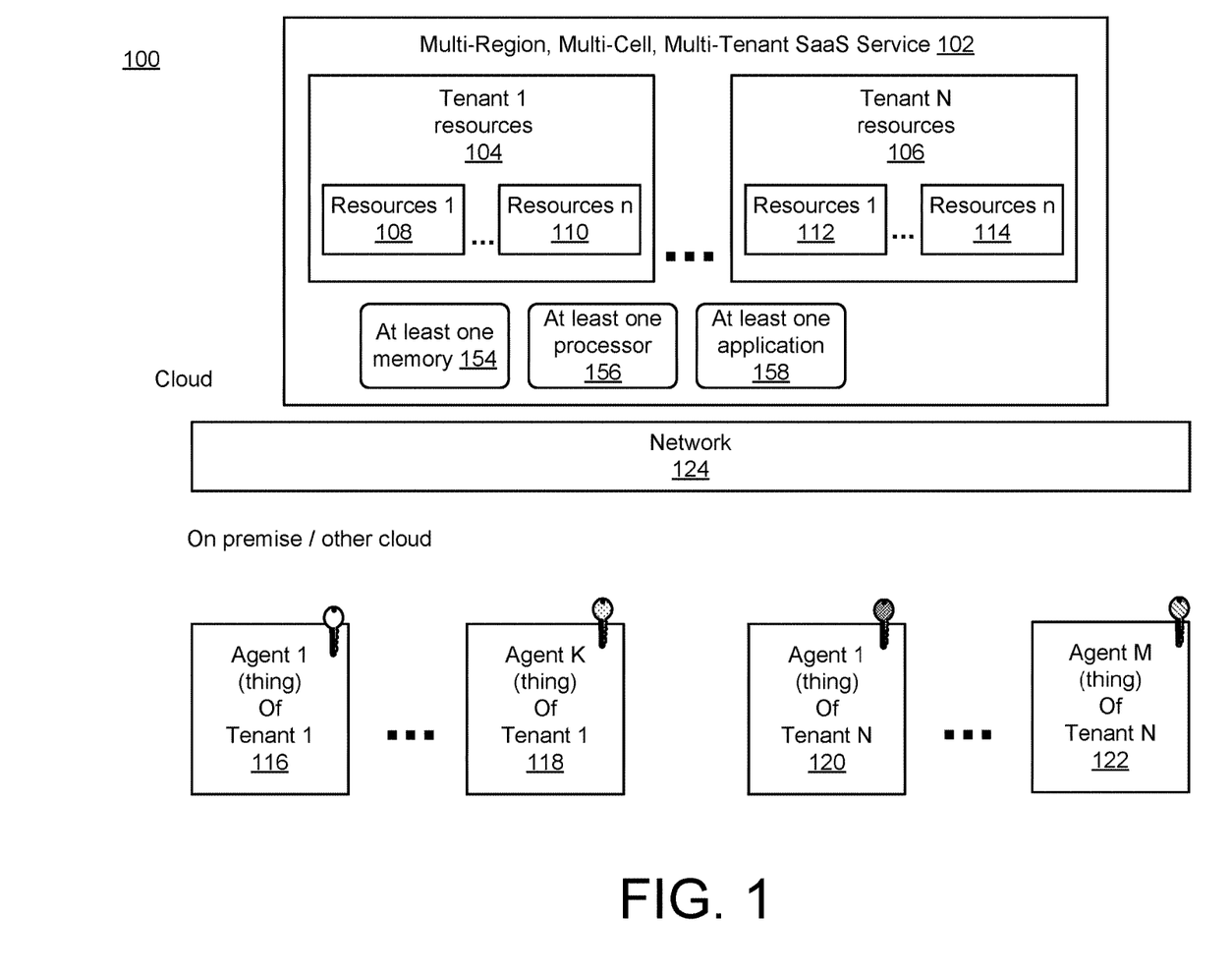
FIG. 1 is a block diagram of an example system for a multi-region, multi-cell, multi-tenant SaaS platform.

FIG. 1 illustrates an example block diagram of a system 100 having a multi-region, multi-cell, multi-tenant SaaS service 102 (or SaaS platform). The SaaS service 102 includes multiple tenants including Tenant 1 104 and Tenant N 106. While two tenants are illustrated for simplification, it is understood that many more tenants are supported and included in the SaaS service 102, with Tenant N 106 representing multiple more tenants. Each of the multiple tenants include multiple resources. For example, Tenant 1 104 includes Resources 1 108 and Resources n 110, where Resources n 110 represents multiple more resources. Similarly, Tenant N 106 includes Resources 1 112 and Resources n 114, where Resources n 114 represents multiple more resources.

The SaaS service 102 deploys multiple agents 116, 118, 120, and 122 to perform jobs and other tasks in communication with the SaaS service 102. The agents 116, 118, 120, and 122 communicate with the SaaS service 102 over a network 124. The network 124 may be a wired and/or wireless network such as, for example, the Internet. The SaaS service 102 may be distributed across multiple computing devices in a cloud environment. The agents 116, 118, 120, and 122 may be installed on computing devices in an on-premise environment and/or in a cloud environment.

Each tenant (Tenant 1 104 and Tenant N 106) has specific resources (e.g., AWS S3, AWS SQS, etc.) that each agent (thing) accesses in order to communicate with the SaaS service 102.

As illustrated using different keys associated with each of the agents, each of the agents 116, 118, 120, and 122 may be associated with a specific resource of a specific tenant on the SaaS service 102. For example, Agent 1 116 may be associated with Resource 1 108 on Tenant 1 104. In this manner, Agent 1 116 may only access Resource 1 108 on Tenant 1 104 and not access other resources such as Resource n 110 on Tenant 1 104 and not access other tenants such as Tenant N 106 on the SaaS service 102.

Agent K 118 may be associated with Resource n 110 on Tenant 1 104. In this manner, Agent K 118 may only access Resource n 110 on Tenant 1 104 and not access other resources such as Resource 1 108 on Tenant 1 104 and not access other tenants such as Tenant N 106 on the SaaS service 102.

Agent 1 120 may be associated with Resource 1 112 on Tenant N 106. In this manner, Agent 1 120 may only access Resource 1 112 on Tenant N 106 and not access other resources such as Resource n 114 on Tenant N 106 and not access other tenants such as Tenant 1 104 on the SaaS service 102.

Agent M 122 may be associated with Resource n 114 on Tenant N 106. In this manner, Agent M 122 may only access Resource n 114 on Tenant N 106 and not access other resources such as Resource 1 112 on Tenant N 106 and not access other tenants such as Tenant 1 104 on the SaaS service 102.

To ensure the agents 116, 118, 120, and 122 can securely communicate with and access only their associated resource and tenant, a secure registration process is used to register the agent to the specific resource and specific tenant on the SaaS service 102. Once registered, a secure communication protocol is used for communications between the specific agent and the specific resource on the specific tenant on the SaaS service 102.

The SaaS service 102 may be implemented on one or more computing devices and may include at least one memory 154, at least one processor 156, and at least one application 158. The computing device may communicate with one or more other computing devices over a network 124. The computing device may be implemented as a server (e.g., an application server), a desktop computer, a laptop computer, a mobile device such as a tablet device or mobile phone device, a mainframe, as well as other types of computing devices. Although a single computing device is illustrated, the computing device may be representative of multiple computing devices in communication with one another, such as multiple servers in communication with one another being utilized to perform the various functions and processes of the SaaS service 102 over the network 124. In some implementations, the computing devices may be representative of multiple virtual machines in communication with one another in a virtual server environment. In some implementations, the computing devices may be representative of one or more mainframe computing devices.

The at least one processor 156 may represent two or more processors on the SaaS service 102 executing in parallel and utilizing corresponding instructions stored using the at least one memory 154. The at least one processor 156 may include at least one graphics processing unit (GPU) and/or central processing unit (CPU). The at least one memory 154 represents a non-transitory computer-readable storage medium. Of course, similarly, the at least one memory 154 may represent one or more different types of memory utilized by the SaaS service 102. In addition to storing instructions, which allow the at least one processor 156 to implement an application 158 and its various components, the at least one memory 154 may be used to store data related to and/or used by the SaaS service 102, and other data and information used by and/or generated by the application 158 and the components used by application 158.

Figure 2:
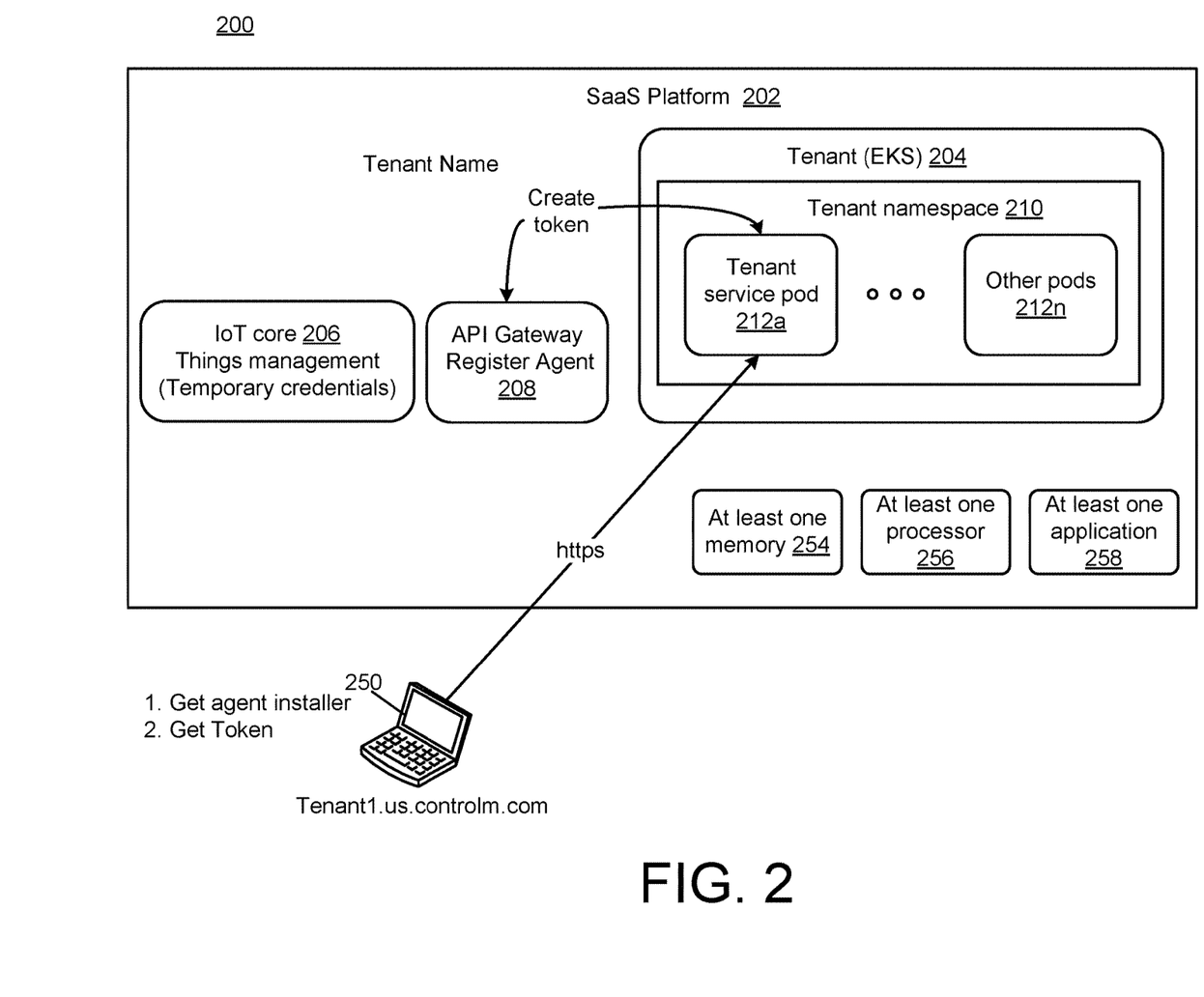
FIG. 2 is a block diagram of an example agent registration process and secure communication protocol between an agent and the SaaS platform.
Figure 3:
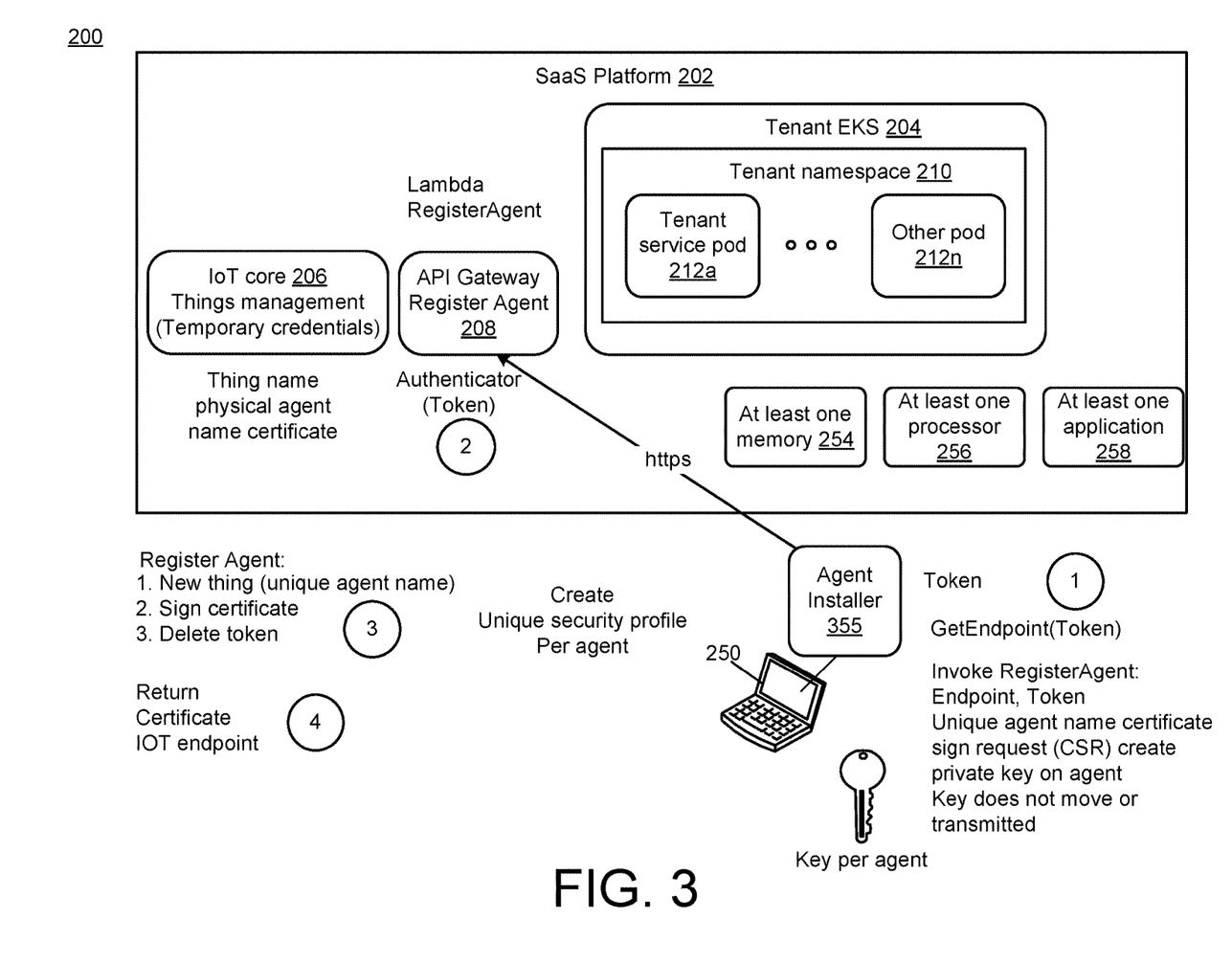
FIG. 3 is a block diagram of an example agent registration process and secure communication protocol between an agent and the SaaS platform.
Figure 4:
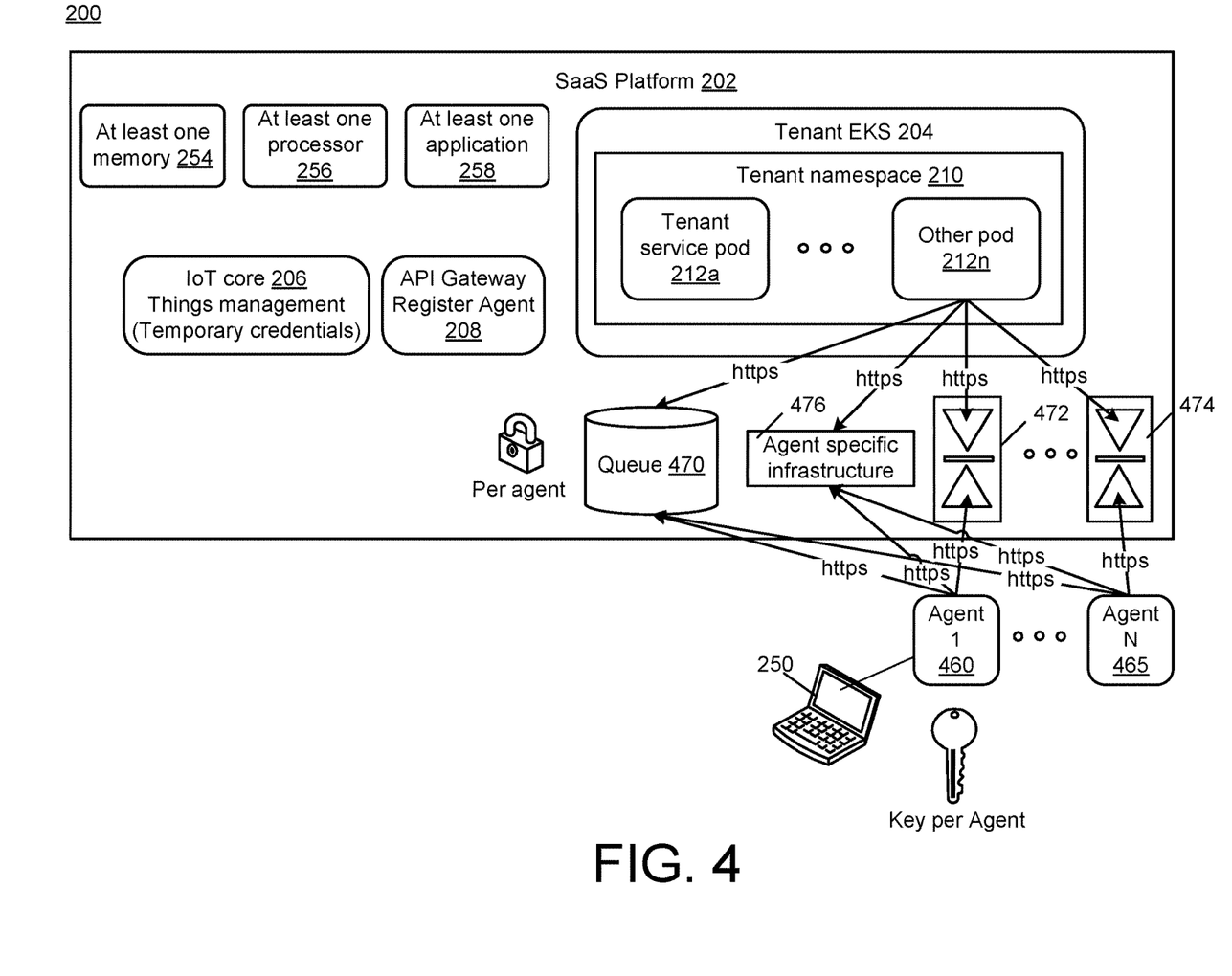
FIG. 4 is a block diagram of an example agent registration process and secure communication protocol between an agent and the SaaS platform.
Figure 5:
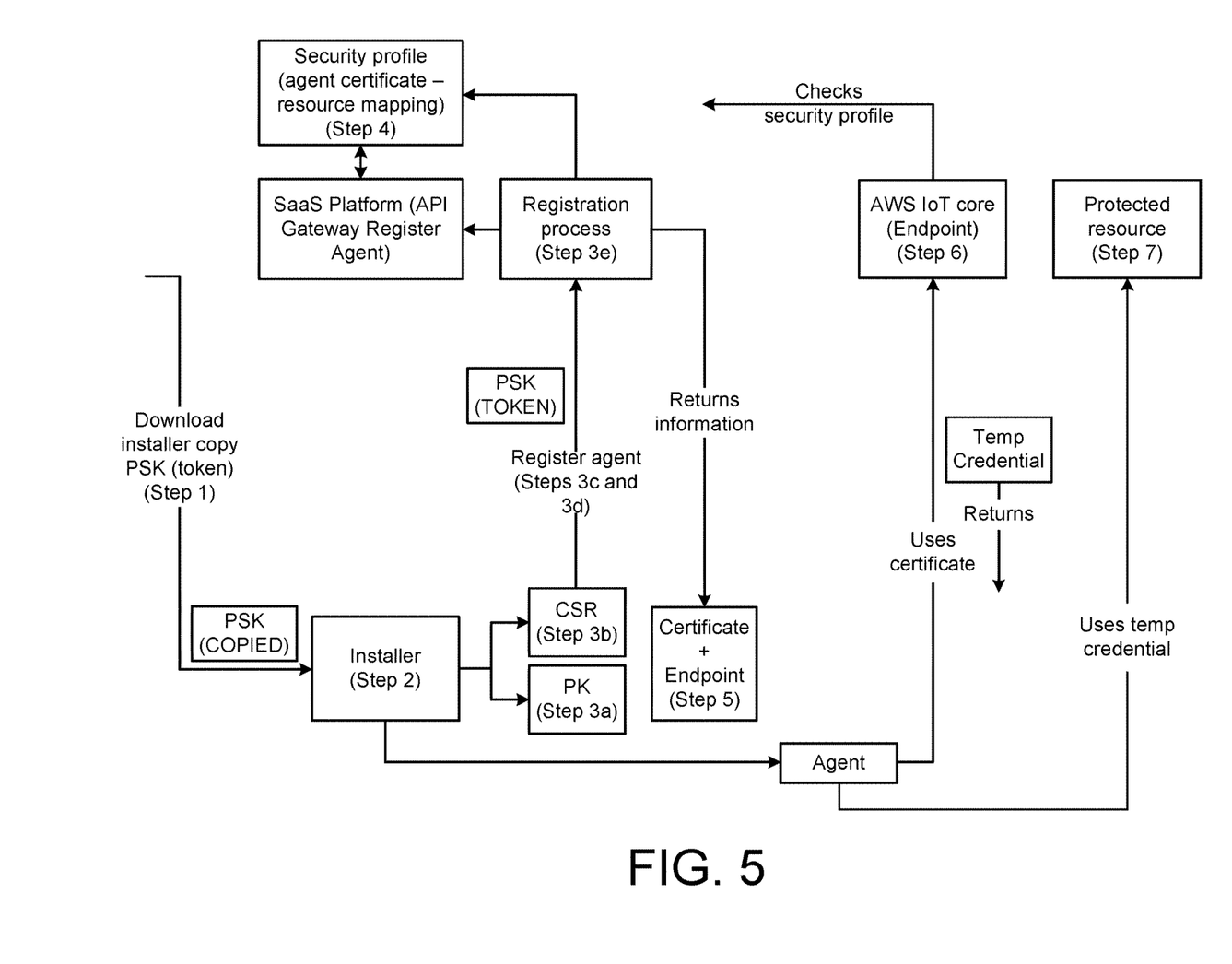
FIG. 5 is an example flow diagram of a process to register an agent using the system of FIGS. 2-4.

FIGS. 2-4 illustrate example block diagrams for the agent registration process and secure communication protocol between an agent and the SaaS platform (or SaaS service). FIG. 5 illustrates an example flow diagram for the agent registration process and secure communication protocol between an agent and the SaaS platform. The registration process and communication protocol are described below with reference to FIGS. 2-5.

FIG. 2 illustrates an example system 200 having a multi-region, multi-cell, multi-tenant SaaS platform 202 (or SaaS service). The system 200 and the SaaS platform 202 may include the same features as the system 100 and the SaaS platform 102 of FIG. 1. Similar to FIG. 1, the SaaS platform 202 may be implemented on one or more computing devices and may include at least one memory 254, at least one processor 256, and at least one application 258. The at least one memory 254, at least one processor 256, and at least one application 258 may include all of the features and functions of the at least one memory 154, at least one processor 156, and at least one application 158 of FIG. 1, respectively.

FIG. 2 illustrates a portion of the registration process to securely install an agent on a computing device 250. In this example, the SaaS platform 202 illustrates a single tenant 204. The tenant 204 in this example is an Elastic Kubernetes Service (EKS). It is understood that the SaaS platform 202 illustrates a single tenant 204 for illustration purposes of the agent registration process only and that the SaaS platform 202 is a multi-region, multi-cell, multi-tenant SaaS platform. It is also understood that EKS is just one example of a tenant and that many other different types of services may be implemented on the SaaS platform 202. The SaaS platform 202 includes an Internet of Things (IoT) core 206, which is a fully managed service for securely connecting and managing IoT devices, and an application programming interface (API) gateway 208. The tenant 204 includes a tenant namespace 210 having multiple tenant service pods 212a-212n.

With reference to FIG. 2 and Step 1 of FIG. 5, the computing device 250 on which the agent is to be installed downloads an installer program (also referred to as an Agent Installer) and obtains and copies a security token, which may be a pre-shared key (PSK) from the SaaS platform 202. The PSK allows non-interactive automation, multi-tenancy security segregation and assignment of an access endpoint for token authentication. That is, the computing device 250 may use a browser application or other web access-type application to access a web interface through which to communicate with the SaaS platform 202. The browser application may use a protocol such as, for example, Hypertext Transfer Protocol Secure (https), to navigate to a designated endpoint within the SaaS platform 202 and to interact with the SaaS platform 202 to obtain the PSK. In this example, the computing device 250 may use a browser application to navigate to an endpoint such as "Tenant1.us.controlm.com" using https protocol. More specifically, the endpoint may be on the tenant service pod 212a in the tenant namespace 210 as part of the tenant 204. It is understood that other applications and other protocols may be used for communication between the computing device 250 and the SaaS platform 202.

As part of this process, to vend a PSK token, an identity provider (IdP) may be used to identify, verify, and/or authenticate the computing device 250 and/or the user of the computing device 250. The tenant service pod 212a may function as the IdP and be configured to provide the identification and verification services using an interactive authentication process. In this manner, prior to receiving the PSK, the computing device 212a may communicate with the tenant service pod 212a and use one or more authentication mechanisms including username, passwords, and/or other multi-factor authentication protocols to authorize access by the computing device 250 to the tenant service pod 212a on tenant 204 on the SaaS platform 202. The tenant service pod 212a verifies the identity of the user of the computing device 250 and/or the computing device 250.

Following the identification, verification, and/or authentication of the computing device 250 and/or the user of the computing device 250, the API gateway 208 generates and creates a unique PSK security token for use in installing and registering the desired agent on the computing device 250. The PSK security token is created and tagged with information, such as TenantID, and then saved to the SaaS platform 202 such as, for example, in the at least one memory 254. In some implementations, the TenantID may be an alphanumeric string that represents the tenant's name. The API gateway 208 communicates the PSK token to the tenant service pod 212a. The tenant service pod 212a embeds the authentication endpoint into the PSK security token, which is needed for ease of the automatic process of registering the Agent (thing). In this example, the authentication endpoint embedded into the PSK security token is the API gateway register agent 208. The tenant service pod 212a makes the PSK security token available for download as part of the agent installer by the computing device 250 so that the PSK security token may be copied to the computing device 250.

Referring to FIG. 3, the system 200 with the SaaS platform 202 is illustrated. In FIG. 3, the computing device 250 has downloaded the PSK security token with the authentication endpoint embedded and the agent installer 355 is illustrated as installed on the computing device 250. With reference to Step 2 of FIG. 5, the security token is used by the agent installer 355 on the computing device 250 as a single input parameter when the agent installer 355 communicates with the SaaS platform 202 in continuing the registration process. That is, the security token is the only parameter needed for the agent installer 355 to communicate with the SaaS platform 202 to continue the registration process. For instance, the agent installer 355 may communicate with the API gateway register agent 208 using a protocol such as, for example, https.

With reference to FIG. 3 and Step 3 of FIG. 5, the following steps occur as part of the agent installer 355 on the computing device 250. In step 3a, the agent installer 355 creates a private key (PK), which is used as the unique key and lock per agent per tenant. The PK remains on the computing device 250 and is not transmitted or communicated to the SaaS platform 202 by the computing device 250. The PK does not move from the computing device 250. In this manner, the PK is secured and safeguarded on the computing device 250. The PK can be created for example using openssl or any other programing language. One example command with openssl is: "openssl req-new-newkey rsa:2048-nodes-keyout pk.key-out pk.csr". In some implementations, the PK is created using a random number generator on the computing device 250 to create an extremely large and highly random number that is then used as the PK.

Once the agent installer 355 creates the PK, then referring to FIG. 5, step 3b, a certificate signing request (CSR) is created for the PK. That is, the agent installer 355 uses the PK to create a CSR. The CSR contains a public key that is signed by the corresponding PK. As mentioned above, the PK does not leave the computing device 250, but instead may be generated and used on the computing device 250 to create the CSR.

With reference to step 3c of FIG. 5, the agent installer 355 extracts the embedded endpoint from the PSK security token and uses the extracted embedded endpoint to access a pre-allocated API gateway register agent 208. The API gateway register agent 208 is pre-allocated by the SaaS platform 202. With reference to step 3d of FIG. 5, the agent installer 355 invokes a register agent API call to the API gateway register agent 208 at the location indicated by the embedded endpoint using the PSK security token with the following parameters: a unique agent (thing) identity and the CSR. That is, the agent installer 355 uses the PSK security token to invoke the register agent API call. In the registration process of step 3e, the API gateway register agent 208 validates and authenticates the PSK security token received from the agent installer 355 against the SaaS platform 202 saved records that were created and saved, for example, in the at least one memory 254, when the API gateway register agent 208 generated the PSK security token for the tenant service pod 212a to send to the computing device 250. The API gateway register agent 208 validates and authenticates the received PSK security token. In some implementations, an authenticator is used to validate and authenticate the received PSK security token. Once validated and authenticated, the API call is processed by the API gateway register agent 208 to allow the invocation of Register Agent API.

With reference FIG. 3 and step 4 of FIG. 5, the Register Agent API creates and stores a security profile (also referred to interchangeably as a security policy) for the agent. The security profile may be stored in the at least one memory 254. That is, the Register Agent API stores the unique agent (thing) identity using the IoT core 206 (e.g., AWS IoT core), creates a new entity named unique agent (thing) identity, signs the CSR, and stores the signed CSR that is specific to the agent. The signed CSR also may be stored in the at least one memory 254. A first mapping maps the unique agent identity with a specific signed CSR. The API gateway register agent 208 creates the security policy that is specific to the agent being registered. The security policy identifies the agent using the unique agent identity and associates or maps the unique agent identity to specific resources per a specific tenant that can be accessed by the agent on the SaaS platform 202.

In this manner, an external entity such as, for example, the agent (thing) running on the computing device 250, is allowed to access its specific resources, e.g., such as an AWS role that provides access to AWS resources. The security policy is a resource mapping of the unique agent identity to the authorized resource(s). The security policy is a second mapping that associates the unique agent identity with specific resources (i.e., also referred to as agent specific infrastructure). The security policy may be changed, updated, and/or revoked by the SaaS service 202 without knowledge of the agent running on the computing device 250. The SaaS service 202, or one of its components, may add and/or delete services that the agent is allowed to access by changing or updating the security policy. The SaaS service 202 also may revoke access to authorized resources by revoking access using the security policy.

In some implementations, a hash function may be applied to the signed CSR to generate a signature. This signature, which is the hash of the signed CSR, may be stored on both the SaaS platform 202, such as in the at least one memory 254, and the computing device 250. In this manner, the signed CSR may be used by the agent to later request temporary credentials to access a specific resource on a specific tenant on the SaaS platform 202. The API gateway register agent 208 may delete the PSK security token because the PSK security token is not used further in the process. The first mapping and the second mapping may be stored in the at least one memory 254.

With reference to step 5 of FIG. 5, the API gateway register agent 208 returns or communicates information to the agent installed on the computing device 250. The information includes the signed certificate and a specific IoT endpoint. The IoT endpoint may be the IoT core 206 that is configured to provide the temporary credentials to the agent installed on the computing device 250 to enable access to the specific resources on the specific tenant. For instance, the API gateway register agent 208 return values are the signed certificate and a specific IoT endpoint. In one example, the IoT endpoint may be an AWS IoT endpoint.

With reference to step 6 of FIG. 5, this enables the agent (thing) on the computing device 250 to obtain temporary credentials by providing the signed certificate and its unique agent identity. The IoT core 206 verifies the signed certificate and the unique agent identity by comparing the received information against the stored security profile, for example, as stored in the at least one memory 254. Upon a match of the received information against the security profile, temporary credentials are returned to the agent. Referring to step 7 of FIG. 5, once the agent (thing) obtains temporary credentials, the agent uses the temporary credentials to access/communicate with its specific resources (e.g., protected resource) based on its SaaS service security policy.

FIG. 4 illustrates the SaaS platform 202 with multiple registered agents, such as, in this example, Agent 1 460 and Agent N 465. For instance, Agent 1 460 may be installed on the computing device 250 using the above process illustrated in FIGS. 2, 3, and 5. For each registered agent, there is one signed CSR per agent (also referred to the key per agent). Thus, Agent 1 460 has one key or one signed CSR and Agent N has its own key or signed CSR. As illustrated in FIG. 4, even when the registered agents, Agent 1 460 and Agent N 465, have authorization to communicate with a specific resource on a specific tenant, they may communicate indirectly using queues 470, 472, and 474, and agent specific infrastructure 476. For instance, each agent may communicate with the other pod 212n through a specific message queue. Agent 1 460 may use queue 472 and Agent N 465 may use queue 474. Queue 472 and queue 474 may be used for standard sized messages. Both agents may communicate with the other pod 212n using queue 470, which may be used for larger size message that are larger than what the other queues 472 and 474 are configured to handle. Both agents also may communicate with the other pod 212n using the agent specific infrastructure 476. For any of the indirect communications, the temporary credentials obtained by the registered agent are used to gain access to and/or communicate with queues 470, 472, 474 and the agent specific infrastructure 476.

The system and techniques described above enable an entity that is external to the SaaS platform 202 to securely access specific resources on specific tenants. Those entities are controlled by a security policy and/or security profile that determines the specific resources that the entity is authorized to access. The system and techniques make it simple for an agent to be registered. In some implementations, an agent may be registered one at a time, as described above. In some implementations, an API may be coded to register multiple agents in a batch-type process using the same steps as detailed above, but for multiple agents.

In some implementations, an event may occur or the SaaS platform 202 may reconfigure in such a manner that the registered agent is not able to obtain a temporary certificate. That is, when the registered agent sends the signed CSR to the designated IoT endpoint, an error code is received. When this occurs, a process may be invoked to re-register the agent with SaaS platform 202.

Figure 6:
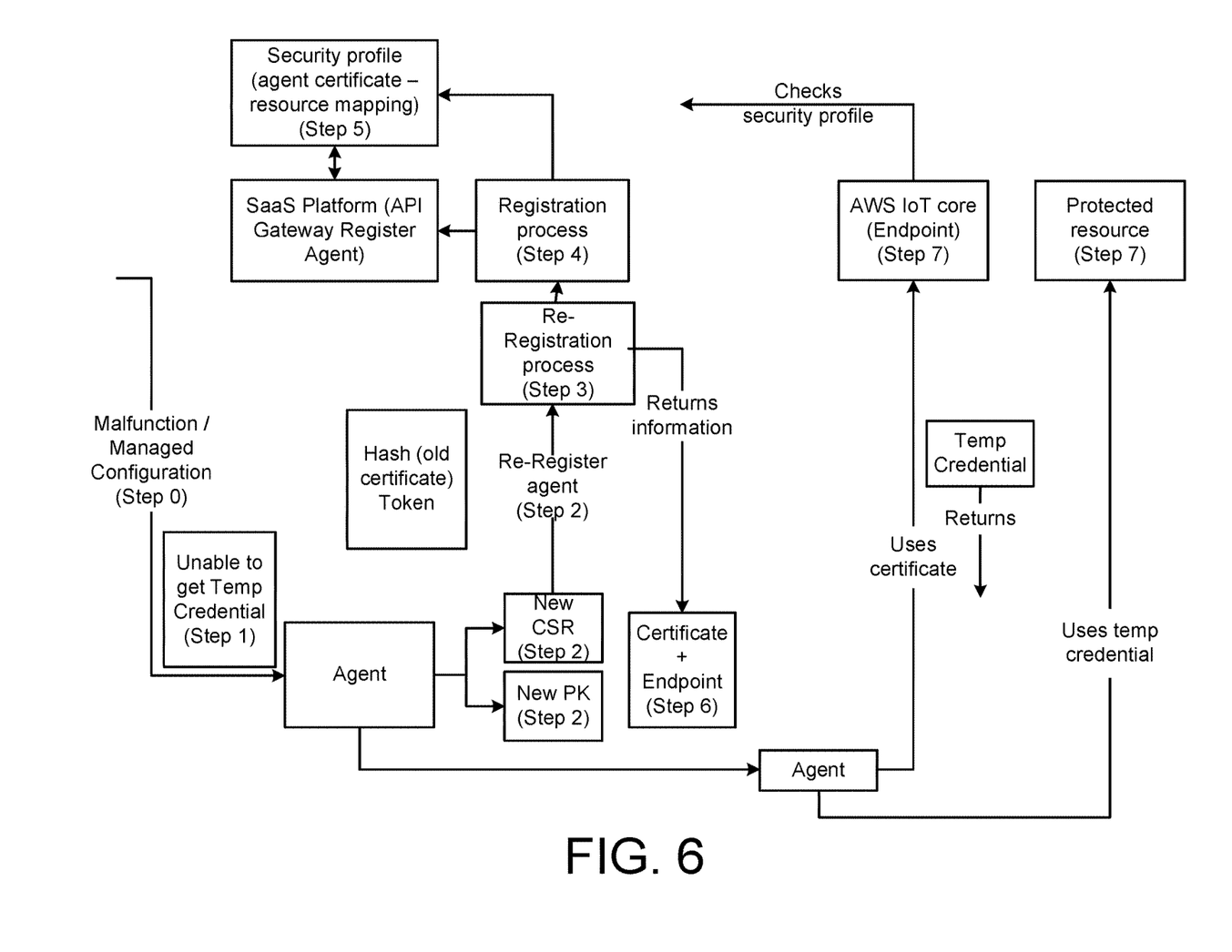
FIG. 6 is an example flow diagram of a process to re-register an agent using the system of FIGS. 2-4.

FIG. 6 illustrates an example process to re-register an agent. At step 0, a malfunction or managed configuration occurs that results in the agent not being able to obtain the temporary credentials needed to access its specific resource at step 1. When this occurs, the agent installed on the computing device 250 generates a new PK and uses the new PK to generate a new CSR. Instead of receiving a PSK security token, the agent uses the hash of the old signed CSR, as mentioned above, to create a new token and invokes a re-register agent in step 2. In step 3, service validation and authentication is performed using, for example, the following factors.

For example, three factors may be used for service validation and authentication. The first factor may be the hash certificate provided by the agent. The second factor may be the unique identity of the agent that was provided to the agent during the initial registration process. The third factor may be the specific cell's confirmation that the unique identity of the agent is indeed invalid along with a hash.

In step 4, the API gateway register agent 208 of the SaaS platform 202 authenticates and validates the existence of the specific agent using the unique identity and verifies that it is invalid. In step 5, upon verification, the register agent is invoked, the new CSR is signed, and a new endpoint is provided as a location for the agent to obtain a temporary credential. In step 6, the new signed CSR and the new endpoint is returned to the agent. In step 7, the agent uses the new signed CSR and sends it to the IoT care new endpoint to obtain the temporary credential. The security profile is now checked out and the agent may use the temporary credential to access the specific resources in accordance with its security profile.

Figure 7:
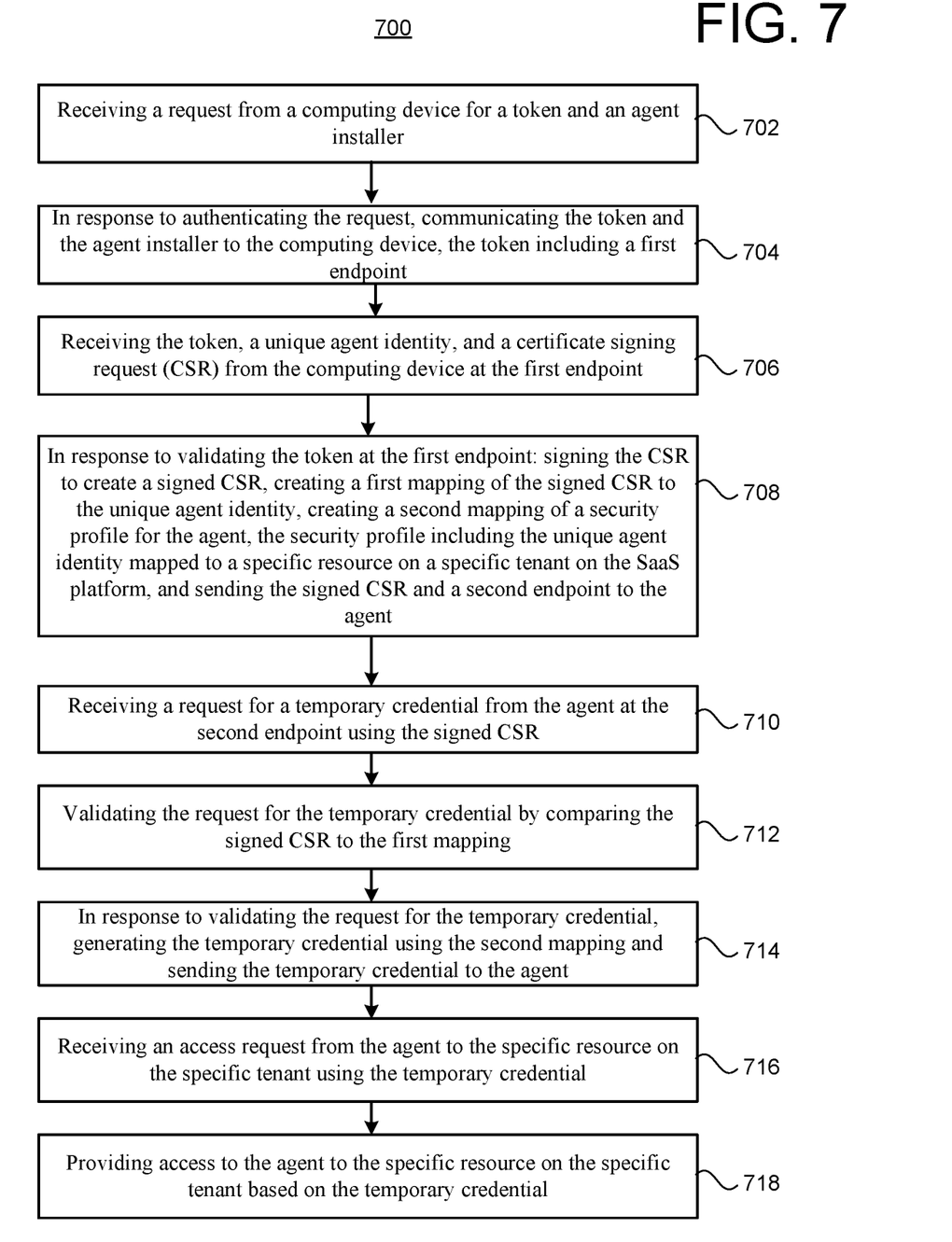
FIG. 7 is an example flowchart of the operations of the system of FIGS. 2-4.

FIG. 7 is an example flowchart for a process 700 illustrating example operations of the system 200 of FIGS. 2-4. More specifically, process 700 illustrates an example of a computer-implemented method for registering an agent and providing access by the agent to a specific resource on a specific tenant on a multi-cell, multi-tenant software as a service (SaaS) platform.

Instructions for the performance of the process 700 may be stored in the at least one memory 254 of FIG. 2, and the stored instructions may be executed by the at least one processor 256 of FIG. 2 on the SaaS platform 202.

Process 700 includes receiving a request from a computing device for a token and an agent installer (702). Process 700 includes in response to authenticating the request, communicating the token and the agent installer to the computing device, the token including a first endpoint (704). Process 700 includes receiving the token, a unique agent identity, and a certificate signing request (CSR) from the computing device at the first endpoint (706). Process 700 includes in response to validating the token at the first endpoint: signing the CSR to create a signed CSR, creating a first mapping of the signed CSR to the unique agent identity, creating a second mapping of a security profile for the agent, the security profile including the unique agent identity mapped to a specific resource on a specific tenant on the SaaS platform, and sending the signed CSR and a second endpoint to the agent (708). Process 700 includes receiving a request for a temporary credential from the agent at the second endpoint using the signed CSR (710). Process 700 includes validating the request for the temporary credential by comparing the signed CSR to the first mapping (712). Process 700 includes in response to validating the request for the temporary credential, generating the temporary credential using the second mapping and sending the temporary credential to the agent (714). Process 700 includes receiving an access request from the agent to the specific resource on the specific tenant using the temporary credential (716). Process 700 includes providing access to the agent to the specific resource on the specific tenant based on the temporary credential (718).

Figure 8:
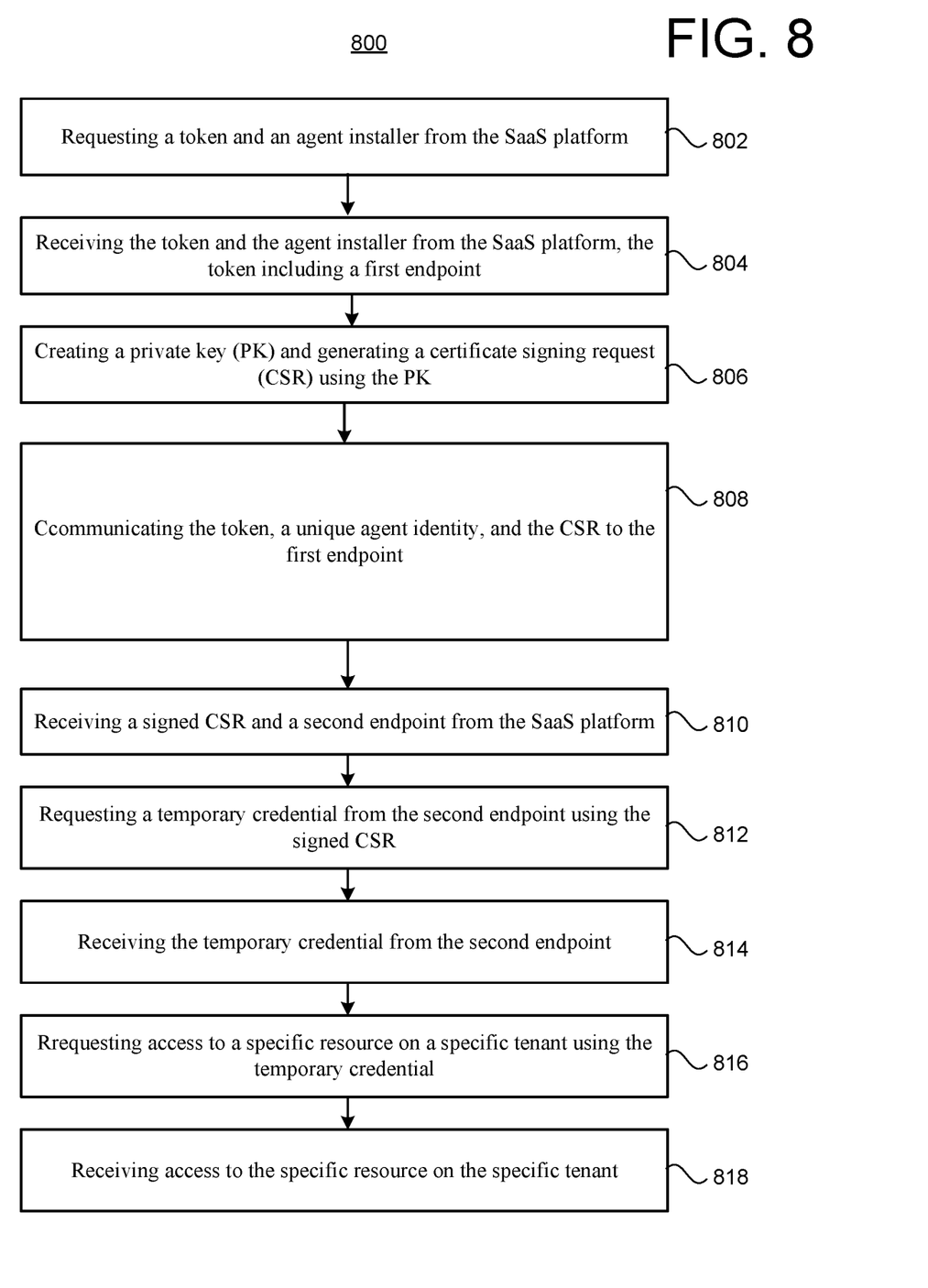
FIG. 8 is an example flowchart of the operations of the system of FIGS. 2-4.

FIG. 8 is an example flowchart for a process 800 illustrating example operations of the system 200 of FIGS. 2-4. More specifically, process 800 illustrates an example of a computer-implemented method for registering an agent and providing access by the agent to a specific resource on a specific tenant on a multi-cell, multi-tenant software as a service (SaaS) platform.

Instructions for the performance of the process 800 may be stored at the computing device 250 of FIG. 2 for example and/or on the SaaS platform 202 in the at least one memory 254 to be executed by the at least one processor 256.

Process 800 includes requesting a token and an agent installer from the SaaS platform (802). Process 800 includes receiving the token and the agent installer from the SaaS platform, the token including a first endpoint (804). Process 800 includes creating a private key (PK) and generating a certificate signing request (CSR) using the PK (806). Process 800 includes communicating the token, a unique agent identity, and the CSR to the first endpoint (808). Process 800 includes receiving a signed CSR and a second endpoint from the SaaS platform (810). Process 800 includes requesting a temporary credential from the second endpoint using the signed CSR (812). Process 800 includes receiving the temporary credential from the second endpoint (814). Process 800 includes requesting access to a specific resource on a specific tenant using the temporary credential (816). Process 800 includes receiving access to the specific resource on the specific tenant (818).

Figure 9:
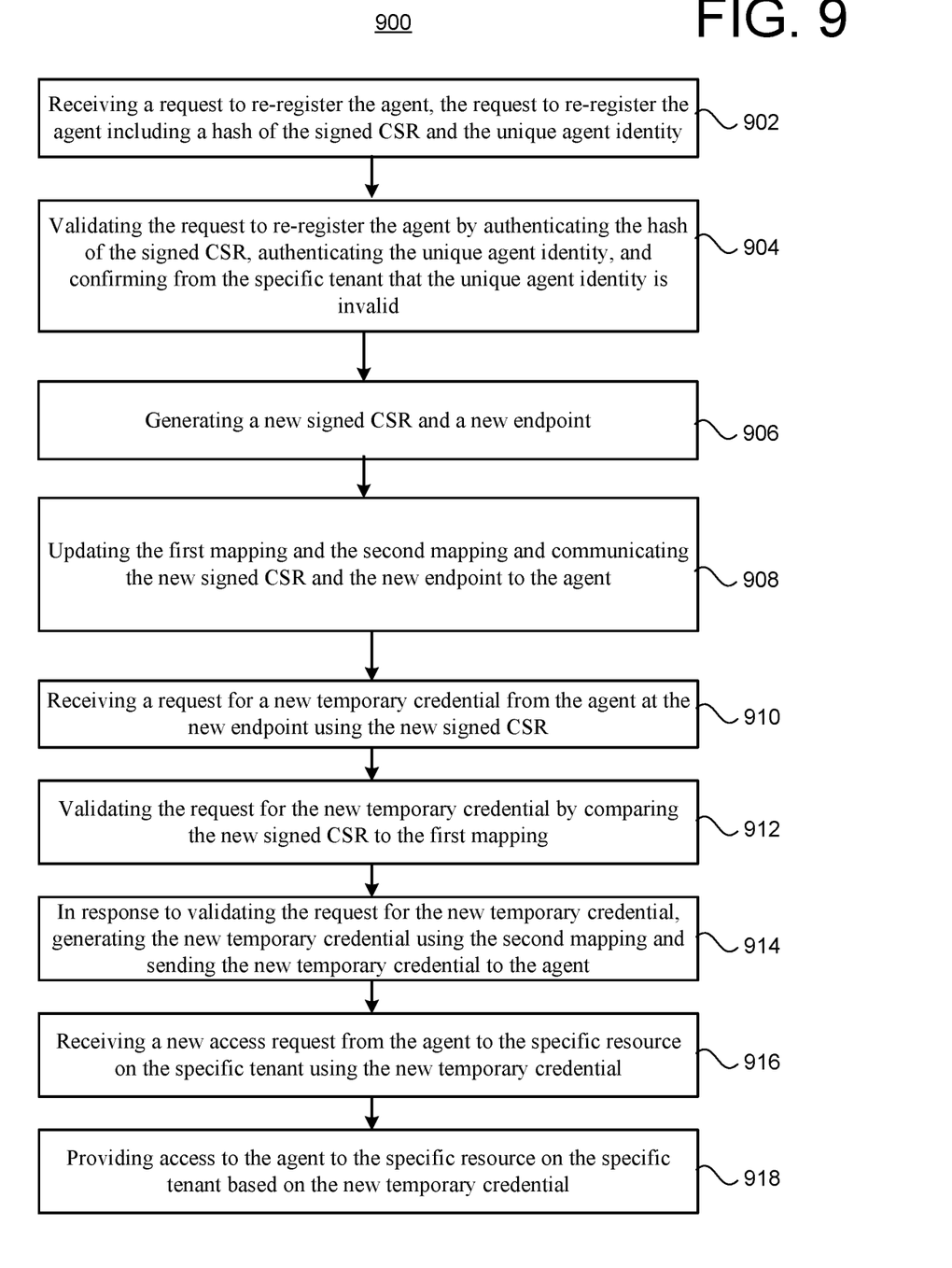
FIG. 9 is an example flowchart of the operations of the system of FIGS. 2-4.

FIG. 9 is an example flowchart for a process 900 illustrating example operations of the system 200 of FIGS. 2-4. More specifically, process 900 illustrates an example of a computer-implemented method for re-registering an agent and providing access by the agent to a specific resource on a specific tenant on a multi-cell, multi-tenant software as a service (SaaS) platform.

Instructions for the performance of the process 900 may be stored in the at least one memory 254 of FIG. 2, and the stored instructions may be executed by the at least one processor 256 of FIG. 2 on the SaaS platform 202.

Process 900 includes receiving a request to re-register the agent, the request to re-register the agent including a hash of the signed CSR and the unique agent identity (902). Process 900 includes validating the request to re-register the agent by authenticating the hash of the signed CSR, authenticating the unique agent identity, and confirming from the specific tenant that the unique agent identity is invalid (904). Process 900 includes generating a new signed CSR and a new endpoint (906). Process 900 includes updating the first mapping and the second mapping and communicating the new signed CSR and the new endpoint to the agent (908). Process 900 includes receiving a request for a new temporary credential from the agent at the new endpoint using the new signed CSR (910). Process 900 includes validating the request for the new temporary credential by comparing the new signed CSR to the first mapping (912). Process 900 includes in response to validating the request for the new temporary credential, generating the new temporary credential using the second mapping and sending the new temporary credential to the agent (914). Process 900 includes receiving a new access request from the agent to the specific resource on the specific tenant using the new temporary credential (916). Process 900 includes providing access to the agent to the specific resource on the specific tenant based on the new temporary credential (918).

Implementations of the various techniques described herein may be implemented in digital electronic circuitry or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may, or be operatively coupled to, receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer-implemented method for registering an agent and providing access by the agent to a specific resource on a specific tenant on a multi-cell, multi-tenant software as a service (SaaS) platform, the method comprising:

receiving a request from a computing device for a token and an agent installer;

authenticating the request by communicating the token and the agent installer to the computing device, the token including a first endpoint;

receiving the token, a unique agent identity, and a certificate signing request (CSR) from the computing device at the first endpoint;
validating the token at the first endpoint by:
  signing the CSR to create a signed CSR,
  creating a first mapping of the signed CSR to the unique agent identity,
  creating a second mapping of a security profile for the agent, the security profile including the unique agent identity mapped to a specific resource on a specific tenant on the SaaS platform, and
  sending the signed CSR and a second endpoint to the agent;
receiving a request for a temporary credential from the agent at the second endpoint using the signed CSR;
validating the request for the temporary credential by comparing the signed CSR to the first mapping;
in response to validating the request for the temporary credential, generating the temporary credential using the second mapping and sending the temporary credential to the agent;
receiving an access request from the agent to the specific resource on the specific tenant using the temporary credential; and
providing access to the agent to the specific resource on the specific tenant based on the temporary credential.

2. The computer-implemented method as in claim 1, wherein the first endpoint is an application programming interface (API) gateway.

3. The computer-implemented method as in claim 1, wherein the temporary credential is invalid after a single access by the agent to the specific resource on the specific tenant.

4. The computer-implemented method as in claim 1, wherein the security profile maps the unique agent identity to multiple specific resources across multiple specific tenants.

5. The computer-implemented method as in claim 1, further comprising:
  receiving a request to re-register the agent, the request to re-register the agent including a hash of the signed CSR and the unique agent identity; and
  validating the request to re-register the agent by authenticating the hash of the signed CSR, authenticating the unique agent identity, and confirming from the specific tenant that the unique agent identity is invalid.

6. The computer-implemented method as in claim 5, further comprising:
  generating a new signed CSR and a new endpoint;
  updating the first mapping and the second mapping; and
  communicating the new signed CSR and the new endpoint to the agent.

7. The computer-implemented method as in claim 6, further comprising:
  receiving a request for a new temporary credential from the agent at the new endpoint using the new signed CSR;
  validating the request for the new temporary credential by comparing the new signed CSR to the first mapping;
  in response to validating the request for the new temporary credential, generating the new temporary credential using the second mapping and sending the new temporary credential to the agent;
  receiving a new access request from the agent to the specific resource on the specific tenant using the new temporary credential; and
  providing access to the agent to the specific resource on the specific tenant based on the new temporary credential.

8. A computer program product for registering an agent and providing access by the agent to a specific resource on a specific tenant on a multi-cell, multi-tenant software as a service (SaaS) platform, the computer program product comprising:
a non-transitory computer-readable medium and including executable code that, when executed, causes a data processing apparatus to:
  receive a request from a computing device for a token and an agent installer;
  authenticate the request by communicating the token and the agent installer to the computing device, the token including a first endpoint;
  receive the token, a unique agent identity, and a certificate signing request (CSR) from the computing device at the first endpoint;
  validate the token at the first endpoint by:
    signing the CSR to create a signed CSR,
    creating a first mapping of the signed CSR to the unique agent identity,
    creating a second mapping of a security profile for the agent, the security profile including the unique agent identity mapped to a specific resource on a specific tenant on the SaaS platform, and
    sending the signed CSR and a second endpoint to the agent;
  receive a request for a temporary credential from the agent at the second endpoint using the signed CSR;
  validate the request for the temporary credential by comparing the signed CSR to the first mapping;
  in response to validating the request for the temporary credential, generate the temporary credential using the second mapping and send the temporary credential to the agent;
  receive an access request from the agent to the specific resource on the specific tenant using the temporary credential; and
  provide access to the agent to the specific resource on the specific tenant based on the temporary credential.

9. The computer program product of claim 8, wherein the first endpoint is an application programming interface (API) gateway.

10. The computer program product of claim 8, wherein the temporary credential is invalid after a single access by the agent to the specific resource on the specific tenant.

11. The computer program product of claim 8, wherein the security profile maps the unique agent identity to multiple specific resources across multiple specific tenants.

12. The computer program product of claim 8, further comprising executable code that, when executed, causes the data processing apparatus to:
  receive a request to re-register the agent, the request to re-register the agent including a hash of the signed CSR and the unique agent identity; and
  validate the request to re-register the agent by authenticating the hash of the signed CSR, authenticate the unique agent identity, and confirm from the specific tenant that the unique agent identity is invalid.

13. The computer program product of claim 12, further comprising executable code that, when executed, causes the data processing apparatus to:
  generate a new signed CSR and a new endpoint;
  update the first mapping and the second mapping; and communicate the new signed CSR and the new endpoint to the agent.

14. The computer program product of claim 13, further comprising executable code that, when executed, causes the data processing apparatus to:
- receive a request for a new temporary credential from the agent at the new endpoint using the new signed CSR;
- validate the request for the new temporary credential by comparing the new signed CSR to the first mapping;
- in response to validating the request for the new temporary credential, generate the new temporary credential using the second mapping and sending the new temporary credential to the agent;
- receive a new access request from the agent to the specific resource on the specific tenant using the new temporary credential; and
- provide access to the agent to the specific resource on the specific tenant based on the new temporary credential.

15. The computer program product of claim 8, further comprising executable code that, when executed, causes the data processing apparatus to update the security profile to map the unique agent identity mapped to a new specific resource on a new specific tenant on the SaaS platform.

* * * * *